Feb. 26, 1929.

J. W. HATHAWAY 1,703,583

INTAKE FOR MILK CANS

Filed March 9, 1927

Inventor
J Willis Hathaway,
By H. Ralph Burton,
Attorney

Patented Feb. 26, 1929.

1,703,583

UNITED STATES PATENT OFFICE.

J WILLIS HATHAWAY, OF CECIL COUNTY, MARYLAND.

INTAKE FOR MILK CANS.

Application filed March 9, 1927. Serial No. 173,970.

This invention relates to means for cooling liquid while it is being poured into a can or other container, and it pertains particularly to a device for use on cans and other containers into which milk is poured from a pail from time to time during milking operations.

The device provided by the invention is arranged to be inserted into the mouth of a container and thus constitute a cover therefor during the intervals of milking before pouring into the container, and it is formed in such manner that milk may be poured therethrough directly into a container without coming into contact with any parts during its passage through the cooling-chamber.

The device, moreover, so is formed that it may hold a pad or other strainer removably in its portion below the cooling-chamber.

When considered with the description herein, the characteristics of the invention are apparent from the accompanying drawing, forming part hereof, wherein an adaptation of the invention for use as an intake for milk-cans is disclosed, for purposes of illustration.

Although the disclosures herein exemplify what now is considered to be a preferable embodiment of the invention, it is to be understood that it is not the intention to be limited necessarily thereto in interpretation of the claim, as modifications and adaptations within the limits of the claim can be made without departing from the nature of the invention.

Like reference-characters refer to corresponding parts in the views of the drawings, of which—

Figure 1:
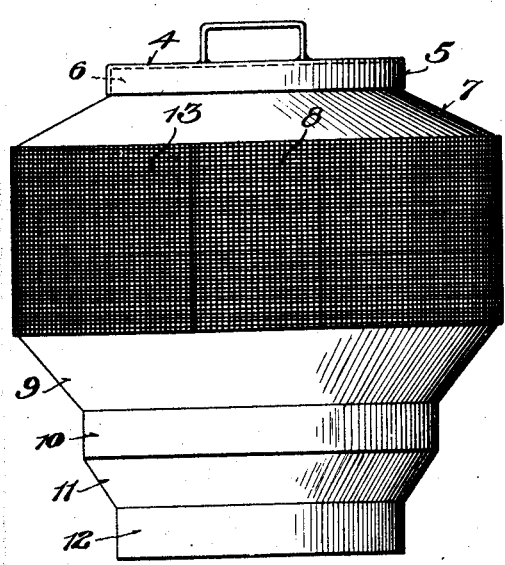
Fig. 1 is an elevation.
Figure 3:
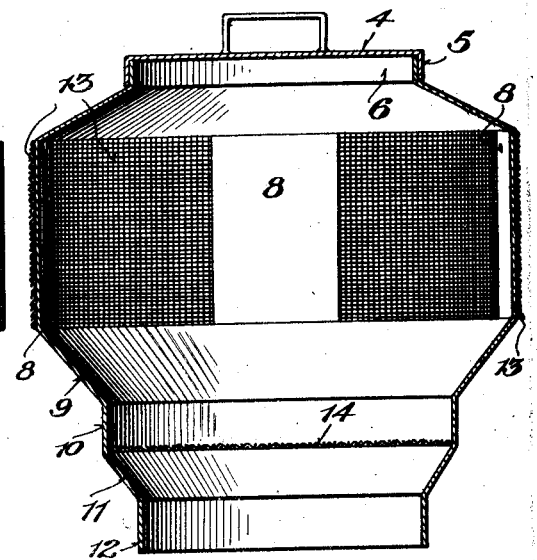
Fig. 3 is a vertical section.
Figure 2:
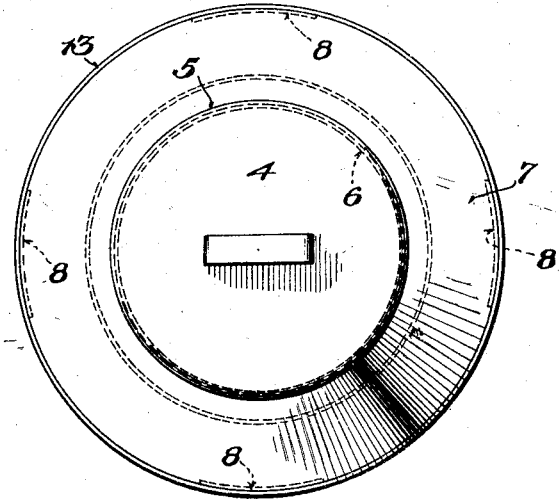
Fig. 2 is a plan view.

The device is provided with a cover 4 having a depending flange 5 arranged to fit around an annular flange 6 surrounding the mouth of the device. The flange 6 is connected with, or formed as a part of, an outwardly-flaring top wall 7. That wall is supported considerably above a funnel-like base or lower portion by uprights 8, which are connected to the outer edge of the top wall and to the outer and upper edge of a downwardly-converging annular wall 9 of the base.

The base or lower portion of the device also includes an annular wall 10 connected to and extending downwardly from the wall 9, a downwardly-converging annular wall 11 connected to and depending from the wall 10, and an annular wall 12 connected to and extending downwardly from the wall 11.

The lowermost part 12 is of a size to have a fairly close fit into the mouth of a can or other container, and the wall 11, which flares outwardly therefrom, is seatable on, and conforms approximately to the contour of, the outwardly-flaring mouth portion ordinarily present in milk-cans.

In the embodiment of the device as shown, the mouth-flange 6 (and thus the mouth itself) and the lowermost part 12 are of substantially the same diameter, and the other side walls are of greater diameter. Consequently, as liquid is poured with ordinary care into the device, it passes without spilling through the space between the top wall 7 and the upper wall 9 of the base. During passage of the liquid through that space or cooling-chamber, which is open to the atmosphere, it has opportunity to lose some heat and thus reach the container below at a lower temperature. Thus, when, for example, milk just taken from an animal is poured through the device from a milking-pail, it reaches the can below at a temperature appreciably lower than that of the animal.

In order to prevent entrance of insects and deleterious matter into the device and the container with which it is associated, the cooling space or chamber is surrounded by a wall, of greater diameter than the mouth, of netted fabric 13, preferably of wire or other suitable pervious material permitting access of the atmosphere, attached to the lower and upper edges, respectively, of the parts 7 and 9; and the cover is kept over the mouth during the periods between pourings.

If desired, a pad or other suitable strainer 14 may be placed in the base portion of the device and rest on the converging wall 11, whence it may be removed easily for cleaning or replacement.

The device can be made readily of thin sheet metal and of wire netting with mesh sufficiently small to exclude insects, taken from commercial stocks.

What I claim as new is:

An intake for containers comprising an annular flange surrounding a mouth, a top outwardly flaring from said flange, uprights connected to and supporting said top, a first downwardly-converging annular wall upon which said uprights are mounted, an annular wall connected to and extending downwardly from said converging wall, a second downwardly-converging annular wall, a lowermost annular wall of substantially the same diameter as said flange, a strainer resting on one of said downwardly-converging walls, and an atmospherically-pervious wall of greater diameter than said mouth surrounding the space between said outwardly-flaring top and said first downwardly-converging wall.

In witness whereof, I affix my signature.

J WILLIS HATHAWAY.